United States Patent [19]

Biber

[11] 3,952,328

[45] Apr. 20, 1976

[54] FILM SCANNER FOR COLOR TELEVISION

[75] Inventor: Conrad H. Biber, Needham, Mass.

[73] Assignee: Polaroid Corporation, Cambridge, Mass.

[22] Filed: Sept. 3, 1974

[21] Appl. No.: 502,450

[52] U.S. Cl. .......................... 358/54; 178/DIG. 28
[51] Int. Cl.² ...................... H04N 9/04; H04N 5/36
[58] Field of Search ............... 178/DIG. 28, 7.1, 7.2, 178/6.7 A, 6.7 R; 358/54, 4–7, 9

[56] References Cited
UNITED STATES PATENTS

| | | | |
|---|---|---|---|
| 2,912,487 | 11/1959 | Horsley | 178/DIG. 28 |
| 3,210,462 | 10/1956 | Trott | 178/7.6 |
| 3,233,039 | 1/1966 | Mullin | 178/6.7 A |
| 3,267,212 | 8/1966 | Goldmark | 178/DIG. 28 |
| 3,522,371 | 7/1970 | Goldmark | 178/6.7 A |
| 3,621,121 | 11/1971 | Eckenbrecht | 178/DIG. 28 |
| 3,774,999 | 11/1973 | Ivestor | 352/12 |
| 3,830,972 | 8/1974 | Siverling | 178/7.1 |

Primary Examiner—Robert L. Richardson
Attorney, Agent, or Firm—John W. Ericson

[57] ABSTRACT

Apparatus for projecting a motion picture on a color television receiver screen with accompanying sound using the audio output apparatus of the television receiver, in which a linear scanning array including a slit source of light is used to develop three color video signals from a motion picture film, and a sound transducer is provided to reproduce a recorded sound signal accompanying the picture sequence. Synchronization signals are developed by a photoelectric pick-up which detects the location of sprocket holes in the film. Switching means are provided to substitute the signals produced by the film transducers for the corresponding signals formed in the television receiver from broadcast signals. The substitute signals are applied to the color amplifiers, to the vertical and horizontal deflection circuits, and to the audio output amplifier of the television receiver. The apparatus is operable to selectively produce either a conventional television program, or a sound motion picture.

4 Claims, 12 Drawing Figures

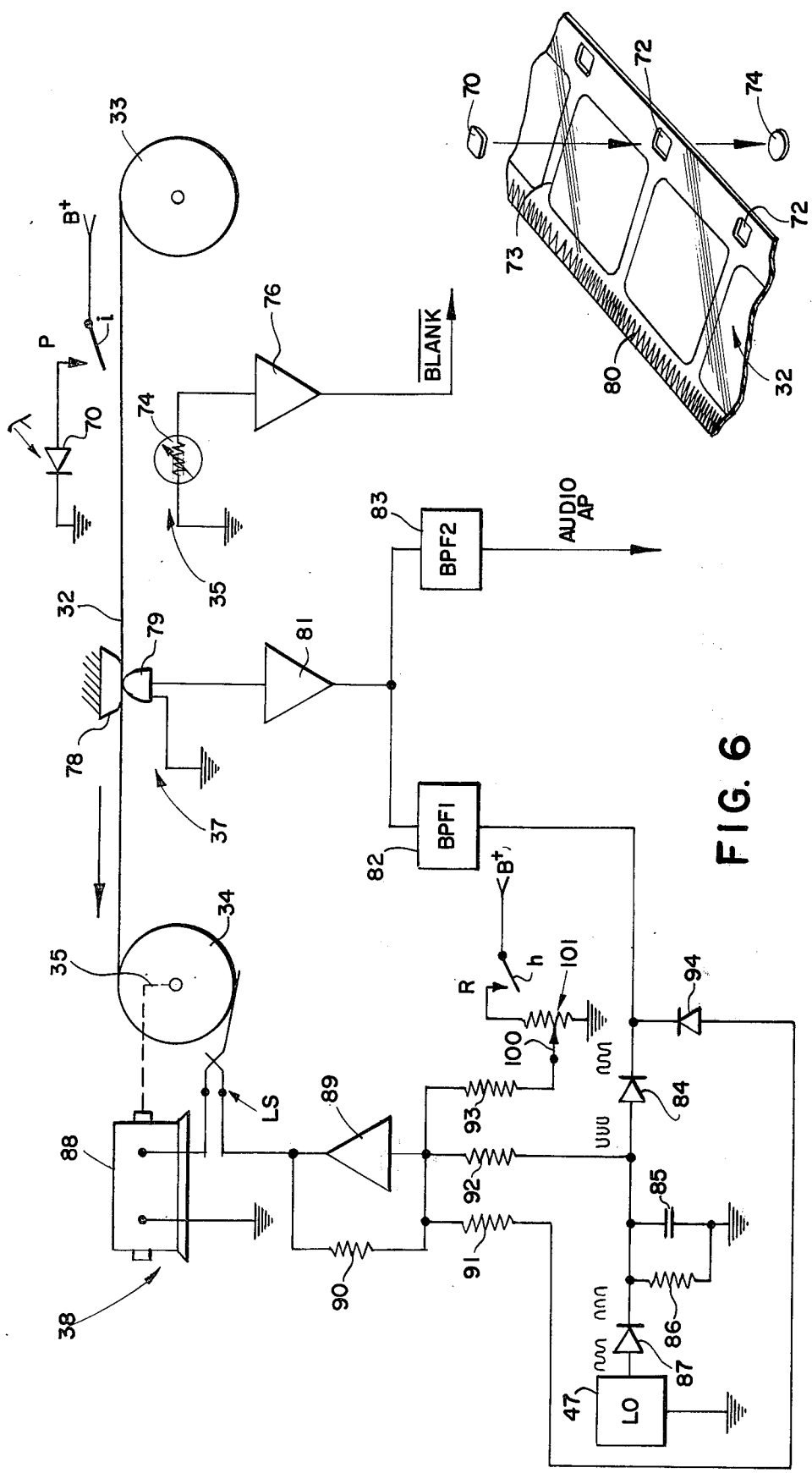

FILM SCANNER FOR COLOR TELEVISION

This invention relates to audiovisual apparatus, and particularly to a novel combination sound motion picture projector and color television receiver.

Extensive efforts have been made in recent years to develop satisfactory sound motion picture apparatus for use by the amateur, especially in the field of super-8 motion picture photography. While a variety of different systems have been proposed, most efforts have been directed toward the development of a conventional motion picture projector, in which the frames are incrementally advanced, and then stopped for projection, at rates from eighteen to twenty-four frames per second. A sound track recorded on the film is reproduced at a separate audio station.

Since the film movement is incremental at the projection gate, and must necessarily be fairly continuous at the sound station, numerous techniques have been developed for achieving these different kinds of motion of the film at different places along its length, while maintaining synchronization of the sound with the picture. One such system is shown and described in U.S. Pat. No. 3,774,999, issued on Nov. 27, 1973 to Andrew S. Ivestor and William R. Wray for ANALOG INFORMATION STORAGE AND RETRIEVAL SYSTEM, and assigned to the assignee of this application. One object of this invention is to obviate the need for two forms of film drive, with intermediate isolation, characteristic of the projector described in that application, as well as other motion picture projectors operating on similar principles. Other objects are to reduce the projector noise characteristics of the operation of a conventional projector, and to improve the quality of images projected from film which may have been over- or under-exposed, or exposed to light of the wrong color temperature for the film used.

Briefly, the above and other objects of this invention are attained by a novel combination motion picture projector and color television receiver in which a single console houses apparatus selectively operable either to produce a sound motion picture, or to receive and produce conventional television program material. The apparatus is converted from one mode of operation to the other by switching means, which may be added to a conventional color television receiver, to interrupt selected circuits that normally supply information from the tuner to the color amplifiers and deflection systems of the receiver, as well as to the audio output amplifier and speaker.

The projector section of apparatus in accordance with the invention comprises means for moving a strip of film at a uniform speed past a video station and a sound station. At the video station are located a linear scanning array for scanning one line of the film at a time, and a synchronization pulse generator. The scanning array comprises a slit source of light. Light from this source passes through the film, and is converted into a series of color video signals. These video signals are sequentially strobed to the color amplifiers of the television receiver in time with horizontal and vertical synch pulses produced by the synchronization pulse generator in response to the movement of the sprocket holes of the film past the video station.

At the sound station, a sound signal is formed in the conventional manner. The sound signal may include a pilot tone recorded with the audio signal, which can be used as a film speed signal to control the speed of a motor driving the film to maintain it very precisely at an accurate predetermined speed.

The apparatus of the invention, and its mode of operation, will best be understood in the light of the following detailed description, together with the accompanying drawings, of a preferred embodiment thereof.

In the drawings,

FIG. 6 is a schematic wiring diagram of a motor control circuit and sound and synchronization station for a film strip forming a part of the apparatus of FIG. 2;

FIG. 7 is a fragmentary schematic perspective sketch of a portion of the film strip and associated synchronization station of FIG. 6;

Figure 1:
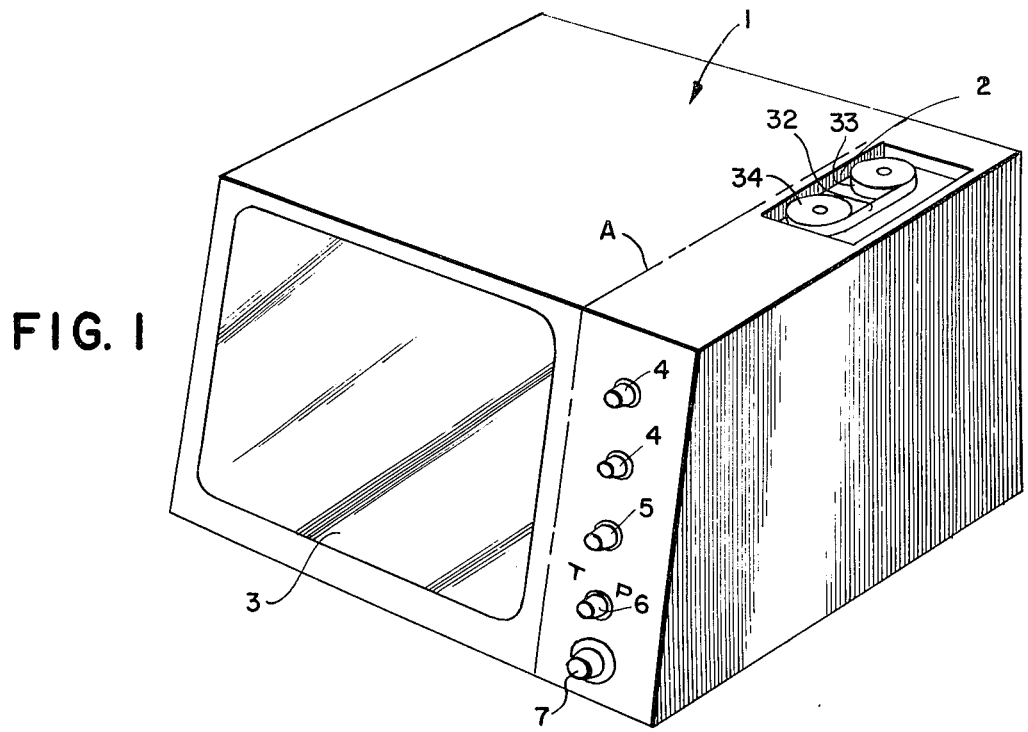
FIG. 1 is a schematic perspective sketch of a combined electronic motion picture projector and color television receiver in accordance with the invention.

Referring now to the drawings, FIG. 1 shows schematically a color television receiver modified in accordance with my invention to incorporate a sound motion picture projection system. As schematically indicated, the receiver comprises a housing generally designated 1 that is somewhat larger than the conventional receiver housing, as indicated by the region to the right of the dotted line A in FIG. 1, to incorporate drive and control apparatus for the motion picture projection station incorporated in accordance with the invention.

As schematically indicated, the housing 1 is formed with a receiving well 2 to adapt it for use with a strip sound motion picture film 32 disposed on a supply reel 33 and a takeup reel 34. The supply and takeup reels may be disposed in a conventional cassette, and engaged with suitable forward and rewind sprockets in the manner of a conventional tape deck. In fact, as will appear, the receptacle 2 may be adapted to receive a conventional magnetic tape cassette, for sound reproduction only, as well as for silent or sound movie reproduction in the manner to be described.

The apparatus of FIG. 1 further comprises a conventional color-receiving tube 3, which may be a conventional three-gun shadow mask tube of the type shown and described in more detail in *Television Engineering Handbook*, published in 1957 by the McGraw-Hill Book Company and edited by Donald G. Fink. The receiver may be provided with any suitable number of conventional adjustment knobs 4, only two of which are shown, a conventional ON-OFF control knob 5, and a knob 6 which controls a switch that selects the mode of operation of the apparatus. In particular, the switch 6 has a position T, in which conventional television programs can be received, and a position P in which the apparatus functions as a sound motion picture projector.

A tuner knob 7 serves to select the desired channel in the T position of the switch 6, and may be set to an unused channel position for use with the projector, if so desired.

Figure 2:
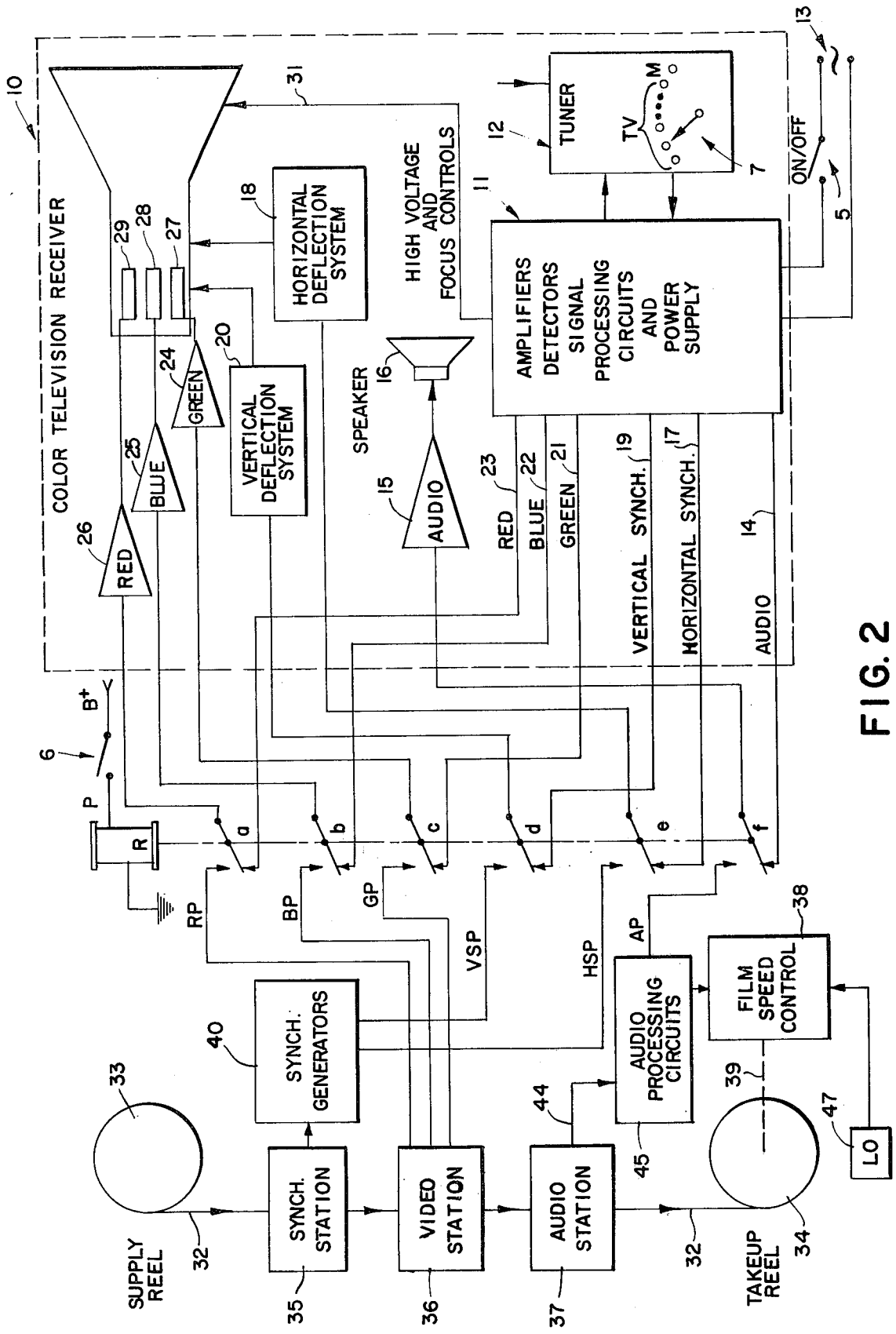
FIG. 2 is a schematic block and wiring diagram of a signal processing system forming a part of the apparatus of FIG. 1.

Referring next to FIG. 2, there is shown schematically the apparatus required to convert a conventional color television receiver to a combined television and movie projector system in accordance with the invention. In particular, a color television receiver circuit, generally indicated within the dotted outline 10, may be entirely conventional except as modified by the switching circuit shown. The switching circuit serves to substitute projector signals, formed in a manner to be described, for the conventional signals produced by the conventional amplifiers, detectors and signal processing circuits, generally indicated at 11, in response to signals received from the conventional tuner, generally indicated at 12. As suggested, the tuning knob 7, connected to the tuner 12, may have a number of conventional channel-selecting positions, indicated by the symbol TV. There is also preferably provided a position M, in which no tuner channel is selected, and the apparatus is adapted for use with the projector apparatus to be described. The purpose of disconnecting the tuner is simply to avoid the presence of stray fields that might cause spurious operation, even though the output circuits of the subsystem 11 are disconnected in the manner to be described.

The power supply for the receiver 10, schematically illustrated as included within the block 11, may be conventional, except that it may be desired to augment it somewhat to supply the additional power required for the projection apparatus to be described. This modification requires only conventional techniques, and will not be described in detail. In general, the power supply is energized by conventional line terminals 13 from a suitable source of alternating voltage, such as a conventional 110 volt/60 cycle supply, when the ON-OFF switch 5 is closed. The apparatus is arranged to produce a suitable supply voltage at B+, referred to hereinafter in connection with various circuits to be described. This supply voltage is relative to a ground terminal, shown in the drawings only where useful to visualize the operation of the circuits to be described.

The circuits 11 produce a audio signal on an output lead 14 in a conventional manner. This signal is supplied to the audio output amplifier 15 of the receiver, for application to the speaker 16, when a relay R is de-energized to complete a circuit from the audio lead 14 over back contact *f* of the relay R to the active input terminal of the audio amplifier 15.

Horizontal synch pulses are produced by the apparatus 11 on a lead 17, which is connected to the active input terminal of the conventional horizontal deflection system 18 over a back contact *e* of the relay R. In this regard, it is preferred to take the horizontal synchronization pulses in the form of the triangular scanning pulses produced just prior to application to the output stage of the horizontal deflection amplifier. The reason is that conventional television signals are arranged to be compatible with a 525-line system in which thirty frames per second are produced with two interlaced fields per frame, using 60 field scans per second. The frame rate, rats, and the interlace feature, are not desirably for motion picture projection in accordance with the apparatus of the invention, so that it is desired to retime the system by producing differently timed triangular wave form horizontal and vertical scanning signals, although the power output stage of the horizontal and vertical deflection systems are used for amplification. Conventional horizontal and vertical sweep generators do not have a sufficient range of operating frequency to accept synch pulses at the rates desirable for direct motion picture projection in the manner here contemplated. Accordingly, the horizontal deflection system 18, for example, is assumed to contain only the output power amplifying stage and the deflection yoke, with the synchronization and sweep generation function being independently carried out for projection and television reception purposes.

Vertical synchronization pulses, comprising a triangular wave form setting the field scan rate, are produced on a lead 19 and applied to the vertical deflection system 20 by a circuit completed over a back contact *b* of the relay R. For use in the projector, as will be described, these pulses are replaced by triangular pulses at the desired frame rate of, for example, twenty frames per second.

Conventional green, blue and red video signals are produced on leads 21, 22, and 23 by the circuits 11 in any conventional manner, for example, as described in the above-cited *Television Engineering Handbook*. These video signals are applied to conventional green, blue and red output amplifiers 24, 25 and 26 over back contacts *c*, *b* and *a*, respectively, of the relay R. The output signals from these video amplifiers 24, 25 and 26 are applied to the three electron guns 27, 28 and 29, respectively, of a conventional shadow mask color receiving tube 3. High voltage and focus controls, symbolized by the line 31, are supplied by the circuits 11 in the conventional manner, which it is not necessary to modify for purposes of this invention.

The apparatus just described, excepting the switching contacts made over the relay R, may be essentially any conventional color television receiver of the three-gun shadow mask tube type.

The relay R has an energizing circuit which extends over the contacts of the mode selection switch 6 from the supply terminal at B+, and thence through the winding of the relay R to ground. When the switch 6 is closed, in the project mode of the apparatus, the relay R engages its front contacts *a* through *f*, as well as certain additional contacts, to be described in connection with other figures of the drawings below.

A conventional sound motion picture film 32 is disposed on a supply reel 33, rotatably mounted either in a cassette adapted to fit into the receptacle 2 in FIG. 1, or in other apparatus in the housing 1, for rotation. The film extends from the supply reel 32 to a takeup reel 34, through a synch station 35, a video station 36, and an audio station 37, to be described in more detail below. The supply reel 34 is arranged to be driven by means schematically indicated as a shaft 39 driven by film speed control means schematically indicated at 38, to be described in more detail below.

The synch station 35 produces pulses, once for each sprocket hole formed along one edge of the film 32, which pulses are applied to synch generators 40. In a manner to be described below, the synch generators 40 produce vertical scanning pulses VSP. The pulses VSP are applied to the vertical deflection system 20 of the receiver 10 over front contact $d$ of the relay R. Horizontal synchronization pulses HSP are similarly produced by the synch generators 40, and are applied to the horizontal deflection system 18 over front contact $e$ of the relay R.

The video station 36 produces red, blue and green video signals RP, BP and GP in response to a photoelectric pick-off, scanning the film in a manner to be described. These video signals are applied to the red, blue and green amplifiers 26, 25 and 24 over front contacts $a$, $b$ and $c$, respectively, of the relay R. In this regard, it is reiterated that principal attention is directed to active leads in describing the circuits herein, it being understood that all circuits are returned to ground in any conventional manner.

The audio station 37 produces an audio signal on an output lead 44 that is applied to audio processing circuits 45, to be described. The audio processing circuits produce an audio signal AP, that is applied to the audio output amplifier 15 of the receiver 10 over front contact $f$ of the relay R. The audio processing circuits also preferably separate a pilot tone, recorded on the sound track of the film 32 at a constant frequency, and apply this pilot signal to the film speed control 38. It is there compared with a fixed frequency signal from a local oscillator 47 to maintain the speed of the film 32 constant as it moves through the synch station, the video station and the audio station.

Figure 3:
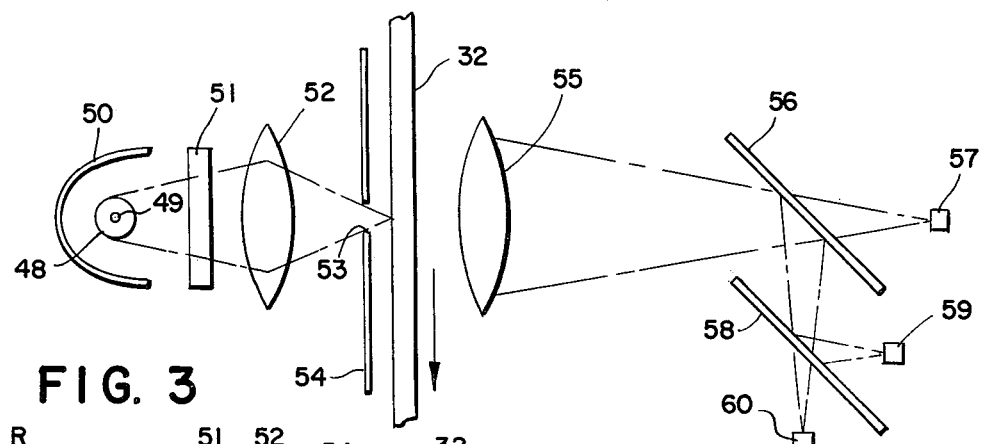
FIG. 3 is a schematic plan sketch, with parts omitted and parts broken away, illustrating a video scanning system useful in the video station forming a portion of the apparatus of FIG. 2.

Referring next to FIG. 3, the video station 36 will next be described. As schematically indicated, the film strip 32 moves through this station in the direction of the arrow. The film 32 may be any conventional color positive or negative transparency, developed in any conventional manner, and comprises preferably super-8 motion picture film at about 72 frames per foot. For this film size, motion of the film 32 at approximately 3⅓ inches per second will produce the desired 20 frame per second rate for scanning and display.

Figure 4:
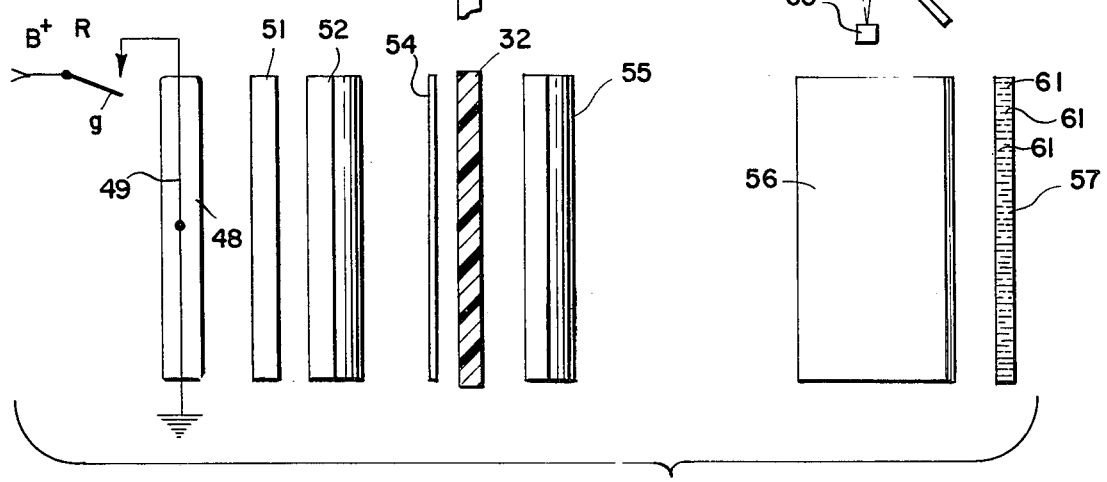
FIG. 4 is schematic plan view of the apparatus of FIG. 3, with parts shown in cross-section and parts omitted.

Referring to FIGS. 3 and 4, the film strip 32 is illuminated by a slit source of light comprising an elongated light bulb 48 of any conventional construction. The lamp 48 has a filament 49 that is energized by a circuit extending from the supply terminal at B+ over a front contact $g$ of the relay R, and thence through the filament 49 to ground.

As suggested in FIG. 3, a suitable reflector 50 may be disposed adjacent the lamp 48 to direct its light toward the film 32. Preferably, a diffuser 51, of ground glass or the like, is placed in front of the lamp 48. Next in the optical path is a cylindrical lens 52, of any conventional construction, which focuses the light from the lamp 48 passing through the diffuser 51 onto a slit 53 formed in a suitable mask 54 between the light source and the film 32. Light from the slit 53 passes through the film 32 and is there focused by a second cylindrical lens 55 onto a color dissecting system. The color dissecting system comprises a first dichronic mirror 56 that passes red light to a first photoelectric storage array 57, and reflects blue and green light to a second dichroic mirror 58. A portion of the light falling on the mirror 58, for example, the green light, is reflected to second photoelectric storage array 59. The blue light, passes by the dichrolic mirror 58, is focused on a third photoelectric storage array 60, for purposes to be described.

In FIG. 4, the only elements of the dissector array shown are mirror 56 and the red-responsive photoelectric storage matrix 57. As schematically indicated in FIG. 4, the storage array such as 57 may comprise a large number of serially arranged photoelectric elements 61, for example, each approximately one-thousandth of an inch in size, in an essentially contiguous but mutually insulated array. Such arrays are well known in the art per se; and are normally packaged in an integrated circuit chip, together with a shift register that function in a manner to be described below to control the distribution of light signals stored in the register elements 61 to external circuits.

Briefly, as the film 32 in moved past slit 53 in FIG. 3, light focused on the arrays 57, 59 and 60 is stored in the form of electrical signals, one set for each of the red, green and blue detectors 57, 59 and 60, one such group of these sets being stored for each line to be displayed in the apparatus to be described. As an example, there may be 512 separate light-responsive elements 61 in each of the arrays 57, 59 and 60. This will give a horizontal resolution in the resulting display that is essentially consonant with the resolution attained in a conventional television presentation.

Figure 5:
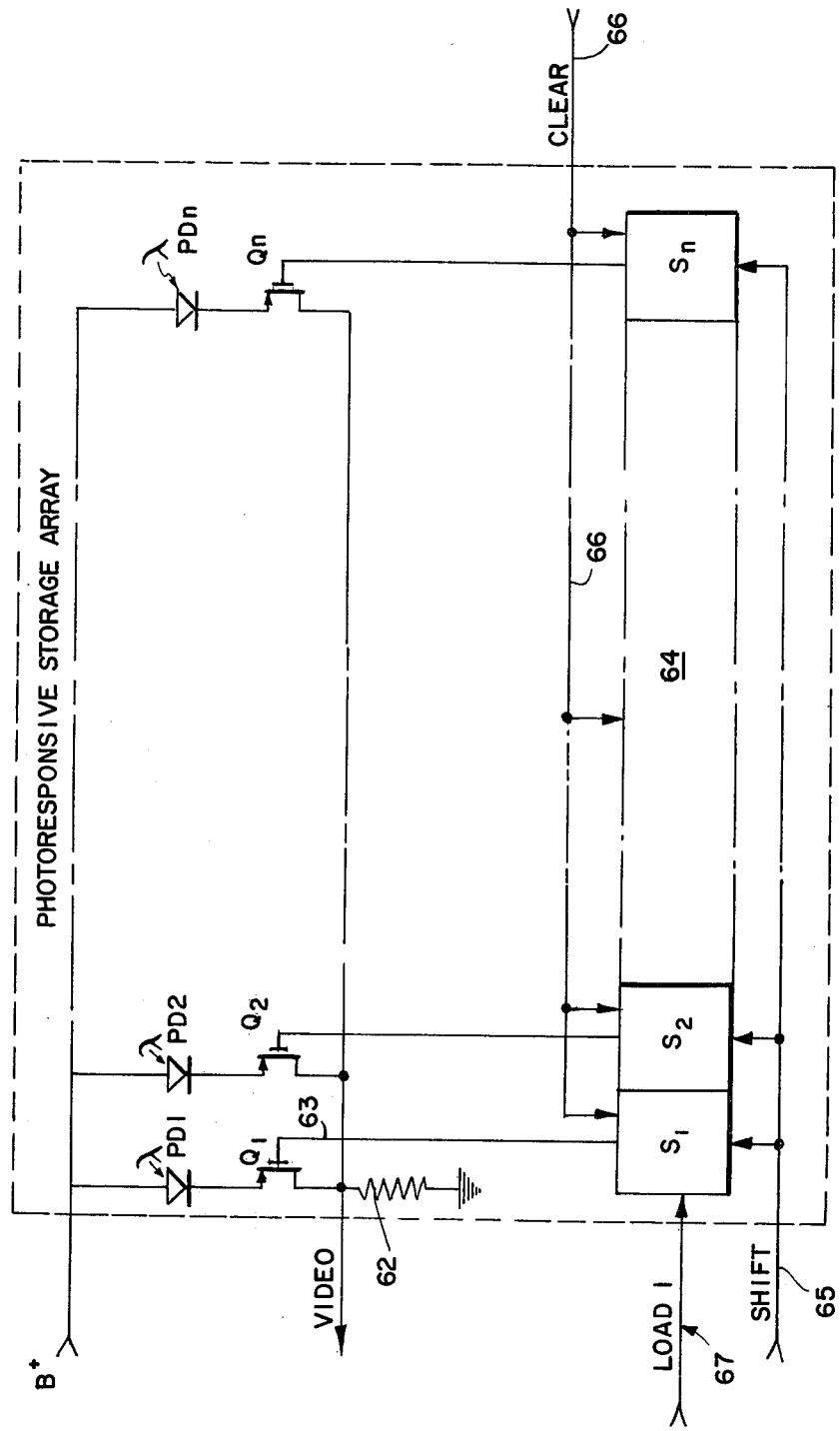
FIG. 5 is a schematic wiring diagram of a photoresponsive storage array forming a portion of the apparatus of FIGS. 3 and 4.

FIG. 5 shows the circuit of the arrays such as 57, 59 and 60 in more detail. The circuit shown in typical for any of the circuits 57, 59 and 60, which may be of identical construction.

As shown, the photoresponsive storage array comprises $n$ photodetectors PD1 through PD$n$, each of which may essentially be a light-responsive diode. Such diodes, when illuminated, will exhibit a resistance determined by the amplitude of the light falling upon them. Each of the diodes such as PD1 is connected in a circuit between the supply terminal at B+ and one terminal of a field effect transistor such as Q1, here shown as the emitter terminal, and thence through the collector to ground through a load resistor 62. When a positive signal is applied to the base terminal such as 63 of any of the transistors such as Q1, current flows through the light-responsive element PD1 and produces an output video signal across the resistor 62 with an amplitude determined by the light falling on the detector such as PD1.

Light stored in the light-emitting elements PD1 through PD$n$ is adapted to be sampled onto the video output terminal by means here shown as a conventional shift register 64 that is normally supplied as a part of the integrated circuit chip comprising the photoresponsive storage array. As schematically indicated, the shift register has $n$ stages S1 through S$n$, for example, 512 such stages, each having an output terminal connected to a corresponding base terminal of a different one of the transistors Q1 through Q$n$.

The shift register stages S1 through S$n$ may essentially comprise conventional flip-flops interconnected as a shift register. The contents of the shift register are adapted to be shifted one location to the right by each of a series of SHIFT pulses applied to a shift lead 65 in FIG. 5. The registers are all adapted to be reset to a zero state, in which no transistor Q1 through Q$n$ is made conducting, by means of a CLEAR pulse applied to a lead 66, which is connected to each stage of the register 64.

In response to a LOAD 1 signal, produced as a positive pulse with respect to ground in a manner to be described below, on a lead 67, a logic 1 bit is loaded into the first storage register S1 of the shift register 64, and causes the transistor 61 to conduct. Subsequently, SHIFT pulses applied to the lead 65 causes the logic 1 bit to be advanced through the register, so that states of the light-responsive diodes PD1 through PDn are sequentially sampled onto the video output lead. In this manner, a line of video information is applied to the appropriate amplifier 24, 25 and 26 as the video signals GP, BP or RP in FIG. 2.

In FIG. 6, the synch station and motor speed control unit are shown in more detail. The synch station may be located in the same line as the video scanning station described above in connection with FIGS. 3 and 4, having been shown functinoally in FIG. 2 as displaced from the video station merely for the purposes of expository convenience and clarity of the drawings. The exact location depends on the relation between the location of the sprocket holes in the film relative to the photographic frame images formed on the film.

Comparing FIGS. 6 and 7, the synch station may comprise a light-emitting diode 70 energized by current from the supply terminal at B+ flowing through a resistor 71 when a front contact $i$ of the relay R is closed. Light emitted by the diode 70 under these conditions is passed by each of a series of sprocket holes 72 formed at the edges of the film 32 in a manner schematically indicated in FIG. 7.

Each of the sprocket holes 72 is located adjacent the ends of each frame 73 of picture information on the film 32, and therefore locates the frames. Should the sprocket holes be placed adjacent the middle of the frames, as in conventional super-8 photography, the synch station would be correspondingly displaced from the video station.

Light passing from the light-emitting diode 70 through one of the sprocket holes 72 falls onto a photocell 74, connected in the input circuit of a suitable amplifier 76 as schematically indicated in FIG. 6. When the photocell 74 is not illuminated, a signal labeled $\overline{BLANK}$, that is positive with respect to ground, is produced by the disappears 76. When the photocell is illuminated, the signal $\overline{BLANK}$ idsappears and the active output terminal of the amplifier 76 goes to ground. The signal $\overline{BLANK}$ is used to time the production of vertical and horizontal scanning pulses in a manner which will be described below in connection with FIG. 8.

The audio station 37 is indicated in FIG. 6 as comprising a conventional back-up pad 78 and an electromagnetic transducer head 79 of any conventional design, adapted to produce an audio output signal when a magnetic stripe 80, formed on the edge of the film 32 as indicated schematically in FIG. 7, is moved past the head 79. The output signal from the head 79 is applied through a conventional pre-amplifier 81 to a pair of conventional band pass filters 82 and 83.

The filter 82 selects a pilot tone, for example, at 8000 Hz, recorded at constant frequency with the sound signal on the stripe 80 when the sound recording is initially made. This pilot signal from the filter 82 is supplied to the cathode of a first isolating diode 84, and from the anode of the diode 84 through an averaging circuit, comprising a capacitor 85 and a resistor 86, to ground. A series of negative pulses is thus applied to the averaging circuit 85, 86 when the pilot signal is reproduced. A series of positive pulses is applied to this averaging circuit through a diode 87 from the local oscillator 47, which is preferably designed to produce a constant frequency signal at, for example, 8000 cycles per second, but in any case, equal to the frequency of the pilot signal reproduced by the filter 82 except for deviations in the speed of the film 32 relative to the transducer 79 from the speed at which the sound signal was originally recorded.

The output signal from the band pass filter 83 comprises the audio signal AP that it is desired to reproduce together with the picture signal in the apparatus of FIG. 2.

The shaft 35 of the film speed control system 38 is shown in FIG. 6 as comrising the output shaft of a conventional DC motor 88. The motor 88 has one input terminal connected to ground, and a second input terminal connected to the active output terminal of a conventional motor control amplifier 89 over the contacts of a normally closed limit switch LS. The switch LS is opened by the film at the end of projection, when it is primarily disposed on the takeup reel and reaches a radius on the takeup reel that engages the arm of the switch.

The amplifier 89 is indicated as having a feedback resistor 90, and three input summing resistors 91, 92 and 93. A first input signal component is applied to the input terminal of the amplifier 89 from the output terminal of the band pass filter 82 through an isolating diode 94 and through the resistor 91. This signal component serves as a speed feedback signal representing the speed of the film 32 past the head 79.

A second input signal component is applied to the input terminal of the amplifier 89 through the resistor 92 from the junction of the diode 84 and the capacitor 85. The signal appearing at this point represents the average difference between the frequency of the oscillator 87 and the frequency of the pilot signal reproduced and separated by the filter 82. It thus serves as a speed error signal.

A third input signal component is supplied through the resistor 93 from a wiper 100 on a potentiometer 101 that is energized by the supply source at the potential B+ when a front contact $h$ of the relay R is closed. This input signal component serves to establish the desired reference speed at the nominal level of, for example, 3⅓ inches per second, for the film 32. The net input signal to the amplifier 89 is thus determined by the difference between the reference signal applied from the wiper 100 and the actual speed of the film, as detected by the resistor 92, with a further error component determined by the difference between the oscillator frequency 87 and speed signal from the filter 82. Appropriate adjustment of the wiper 100 will make the signal applied through the resistor 92 zero when the average speed of the film 32 is 3⅓ inches per second.

Figure 8:
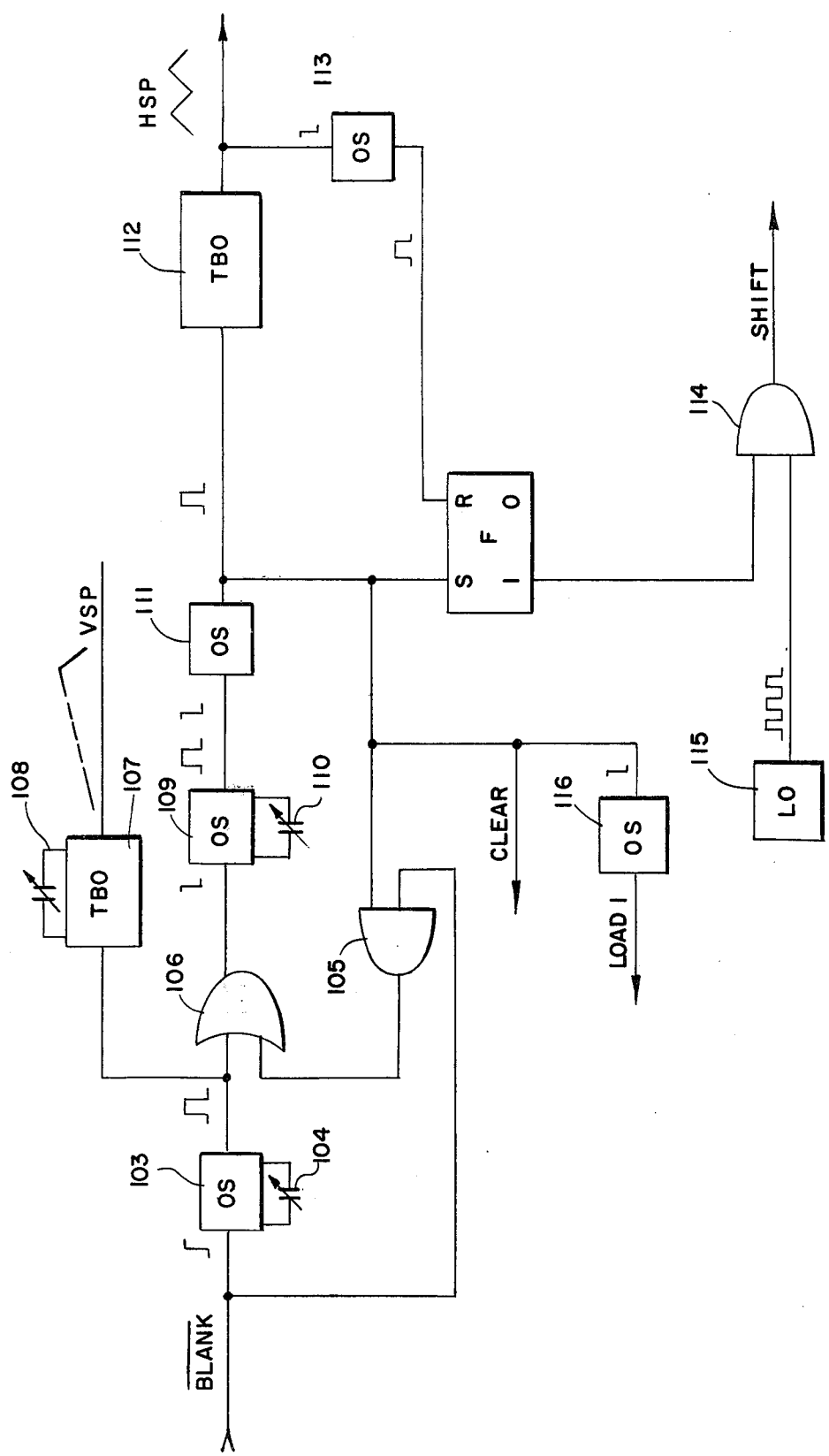
FIG. 8 is a schematic block and wiring diagram of synchronization signal generators forming a part of the apparatus of FIG. 2.

Referring next to FIG. 8, the manner in which the horizontal and vertical synchronization pulses HSP and VSP are generated will next be described. As shown, the signal $\overline{BLANK}$, produced by the amplifier 76 in the manner described above the connection with FIG. 6, is applied to the trigger input terminal of a conventional one-shot multivibrator 103. At the leading edge of the $\overline{BLANK}$ signal, which appears when a sprocket hole 72 in FIG. 7 passes the photocell 74 and the light falling on the photocell is blocked, the one-shot multivibrator 103 produces a positive pulse. The duration of this pulse may be controlled, as suggested by the variable capacitor 104 connected to the multivibrator 103. This control is used to permit the adjustment of the start of the first horizontal scanning pulse, relation to the beginning of each vertical scanning pulse, so that the successive lines of horizontal scanning occur at appropriate places on the face of the tube 3 in FIG. 2.

The signal BLANK is also applied to one input terminal of a conventional two input terminal AND gate 105. The output terminal of the gate 105 is connected to one input terminal of a two input terminal OR gate 106. A second input terminal of the gate 106 is connected to the active output terminal of the one-shot multivibrator 103.

The leading edge of the pulse produced by the multivibrator 103 triggers a conventional triggered blocking oscillator 107 to produce a saw tooth output vertical scanning pulse VSP at a rate, preferably, of twenty per second, including the vertical rise portion during which the picture display is produced, and the falling portion corresponding to the vertical retrace and blanking interval. The oscillator 107 is shown provided with a variable capacitor 108 so that the duration of these pulses dan be adjusted as desired.

The trailing edge of each pulse produced by the one-shot multivibrator 103 is supplied through the OR gate 106 to trigger a conventional one-shot multivibrator 109. When triggered, the multivibrator 109 produces a positive output pulse having a duration determined by the adjustment of a variable capacitor 110. Adjustment of the capacitor 110 is provided to allow the repetition rate of the horizontal scanning pulses to be adjusted to match exactly 525 of these pulses to the vertical scanning pulses VSP.

The trailing edge of the pulse from the multivibrator 109 triggers a one-shot multivibrator 111 to produce a positive output pulse. The trailing edge of this pulse triggers a triggered blocking oscillator 112 to produce a saw tooth HSP pulse for each pulse produced by the multivibrator 111. The rise portion of each of these pulses corresponds to the writing of a line across the screen of the receiver tube 3 in FIG. 2, and the fall time corresponds to the horizontal blanking and retrace interval.

The pulses from the output terminal of the one-shot multivibrator 111 are also applied to the second input terminal of the AND gate 105. During the interval BLANK, between sprocket holes in the film, the gate 105 is thus enabled to pass the pulses from the multivibrator 111 to retrigger the one-shot multivibrator 109 at the trailing edge of each such pulse, so that the combination 109, 111 will oscillate during the interval between sprocket holes.

The pulses from the one-shot multivibrator 111 each also set a conventional flip-flop F. This flip-flop is reset at the trailing edge of each horizontal scanning pulse HSP by a one-shot multivibrator 113, as shown in FIG. 8.

The flip-flop F is thus set during each horizontal scanning interval. When set, a logic 1 signal appears at the logic 1 output terminal of the flip-flop F and enables a conventional AND gate 114. When so enabled, the gate 114 passes pulses from a local oscillator 115, labeled SHIFT, that cause shifting of each of the registers such as 64 in FIG. 5 for each of the photodetector arrays 57, 59 and 60 in FIG. 3. If there are 512 stages in these shift registers, 512 such SHIFT pulses are accordingly produced during each horizontal scanning interval.

The pulses from the multivibrator 111 are applied to a lead labeled CLEAR in FIG. 8, corresponding to the CLEAR lead in the typical circuit of FIG. 5 for resetting each of the shift registers in the photoresponsive storage arrays.

The trailing edge of each pulse from the multivibrator 111 triggers a one-shot multivibrator 116 to produce a pulse labeled LOAD 1 that loads a one into the first stage of each of the shift register circuits 64 typified in FIG. 5.

Figure 10:
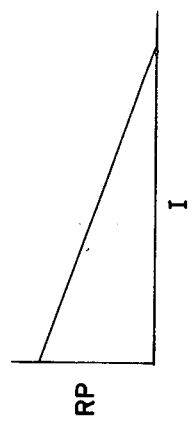
FIG. 10 is a schematic graph of output signal versus light intensity characteristics of the operation of the apparatus of FIG. 2 using the amplifier of FIG. 9.
Figure 9:
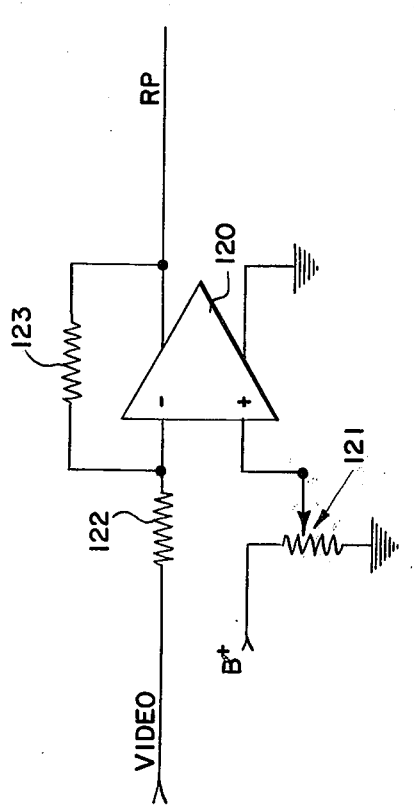
FIG. 9 is a schematic wiring diagram of a video pre-amplifier forming a part of the apparatus of FIG. 2.

FIG. 9 shows a typical amplifying output stage for producing one of the video signals such as the signal RP in response to strobing of the photoresponsive storage array typified in FIG. 5 to supply video information. The FIG. 9 circuit is adapted to receive a VIDEO signal such as that produced across the resistor 62 in FIG. 5, and is especially adapted for use in projecting pictures from frames formed as color negatives of the additive screen type such as that described in copending U.S. application for Letters Patent Ser. No. 463,260, filed on April 23, 1974 by Edwin H. Land for PHOTOGRAPHIC COLOR PRODUCTS AND PROCESSES and assigned to the assignee of this application. In such negative color images, the density of the developed silver image decreases with the amount of light falling on the film during exposure. Thus, the intensity of the electron beam on the tube 3 should be decreased as the amplitude of the VIDEO signals from the photoresponsive storage arrays 57, 59 and 60 increases. For this puspose, an operational amplifier 120 may be employed. The non-inverting input terminal of the amplifier 120 is supplied with a reference signal from a potentiometer 121. The inverting terminal of the amplifier 120 receives the VIDEO signal, as from the typical lead across the resistor 62 in FIG. 2, through an input summing resistor 122. The overall gain of the amplifier 120 is controlled by a suitable feedback resistor 123. With this arrangement, an increase in the amplitude of the VIDEO signal causes a decrease in the output signal RP, as shown in FIG. 10, so that the appropriate direction of control is exercised.

Figure 11:
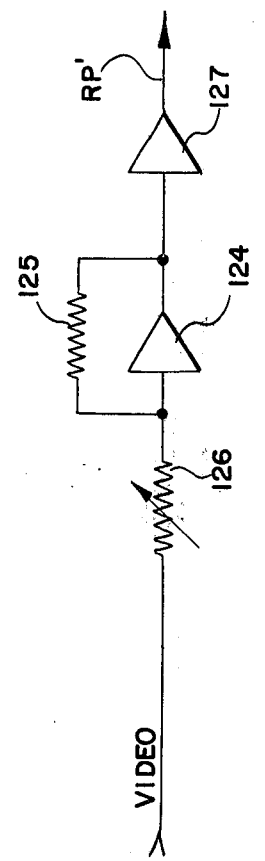
FIG. 11 is a schematic wiring diagram of an alternate form of a video pre-amplifier useable in the apparatus of FIG. 2 for positive transparencies.

FIG. 11 shows a circuit arrangement for producing signals RP' from VIDEO signals produced in the manner illustrated in FIG. 5 for use with conventional film on which the images are formed as color transparencies of the positive type. For this purpose, the VIDEO signal is simply amplified, by an amplifier schematically indicated at 124, and inverted, if desired, by an inverter 127, to produce an increasing signal of appropriate polarity for application to the corresponding red, green and blue amplifiers in FIG. 2.

Figure 12:
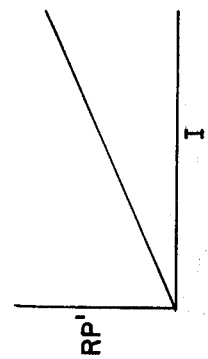
FIG. 12 is a schematic graph of output signal versus light intensity characteristics of the operation of the system of FIG. 2 using the amplifier of FIG. 11.

Color intensity of the signal RP' may be adjusted by adjusting a variable resistor 126 relative to a fixed feedback resistor 125, as shown in FIG. 11. FIG. 12 shows the increasing characteristic of the signal RP' as intensity is increased.

Having thus described the apparatus of this invention, its operation will next be described, with reference to FIGS. 1 through 9. First, assume that a supply of film 32 on reels 33 and 34 is disposed relative to the apparatus as shown in FIGS. 1 and 6, that the ON-OFF switch 5 in FIG. 1 is turned to its closed position, so that power is supplied to the circuits 11 in FIG. 2, and that the switch 6 is in its P position, so that the relay R is energized, closing its front contacts a through i. Referring to FIG. 6, the amplifier 89 will initially receive only positive signals from the oscillator 87 and from the potentiometer wiper 100.

The motor 88 will begin to run at increasing speed, until the sound pilot signal as detected by the head 79 increases to an amplitude at which the negative signals supplied to the amplifier 89 balance the positive signals, and the motor 88 runs at constant speed. Each time a sprocket hole 72 is encountered by the synch generator 35, the photocell 74 will conduct, pulling down the input signal to the amplifier 76 and accordingly removing the level $\overline{\text{BLANK}}$, producing a ground-going transition at the output terminal of the amplifier 76.

Referring to FIG. 8, the low signal produced by the removal of the signal $\overline{\text{BLANK}}$ will disable the gate 105 and no further electronic action will take place until the sprocket hole is passed and the level $\overline{\text{BLANK}}$ reappears. When that occurs, the leading edge of the rising transition thus produced will trigger the one-shot multivibrator 103 to produce an output pulse. At the same time, the gate 105 will be re-enabled. The leading edge of the pulse produced by the multivibrator 103 will trigger the oscillator 107 to produce a first vertical scanning pulse, and the electron beam in the receiver tube 3 in FIG. 2 will begin to be deflected.

At the trailing edge of the pulse from the multivibrator 103, the multivibrator 109 will be triggered to produce an output pulse. The trailing edge of this pulse will trigger the multivibrator 111 to produce a pulse. The trailing edge of that pulse will retrigger the multivibrator 109, and trigger the oscillator 112 to produce a first horizontal scanning pulse. During this scanning pulse, the flip-flip F will be set, and a SHIFT pulse will be produced by the gate 114 in response to each pulse from the oscillator 115 to cause the signals produced by the photoresponsive arrays 57, 59 and 60 in FIG. 3 to be strobed into the color amplifiers. Thus, referring to FIG. 2, a stream of red VIDEO signals RP, blue VIDEO signals BP, and green VIDEO signals GP will be applied over front contacts $a$, $b$ and $c$ of the relay R to the red, blue and green amplifiers 26, 25 and 24, respectively. A color line will thus be written across the face of the tube 3.

It should be noted that each of the photodiodes, such as the photodiode PD1 in FIG. 5, will be strobed only once during each line cycle, so that they have the remaining time in which to respond to light energy passed through the film 32. It will be apparent that some movement of the film takes place during this interval. However, since the output is quantized to 525 lines per frame, the resulting movement will not make a discernable difference in resolution of the projected image.

The film will continue to be scanned a line at a time by successive horizontal scanning pulses HSP for the remainder of the frame. This process will be interrupted by the vertical blanking interval during the fall time of the pulse VSP in FIG. 8, and will be terminated by the same interval, assuming appropriate settings of the oscillator times, by the arrival of the next sprocket hole which will again remove the level $\overline{\text{BLANK}}$ and complete the cycle just described.

Operation may continue in this manner until all of the images on the film have been projected, whereupon operations will be terminated, as the trailer of the film piles up on the supply reel, by opening the switch LS. The switch 6 on the console can then be set to the T position, so that the apparatus can be employed as a television receiver until a new film is put in place for projection. While not shown in the drawings, it will be apparent that the switch 6 can also be used to interrupt the supply of electrical energy to all of the components of the projection system in the T position, and to all of the unused components of the receiver in the P position.

While the invention has been described with respect to the details of specific embodiments thereof, many changes and variations will occur to those skilled in the art upon reading this description, and such can obviously be made without departing from the scope of the invention.

Having thus described the invention, what is claimed is:

1. In combination with a television receiver having a cathode ray tube, deflection means responsive to applied synchronization signals for producing a raster in said tube, and video signal responsive means for modulating said raster to produce a visible display, a slit source of light, an elongated array of linear photoresponsive signal producing means, means mounting said source and said array in confronting relationship, means for moving a strip of motion picture film bearing transparency images between said source and said array, means responsive to the movement of said film for applying deflection signals to said deflection means, and distributing means for applying video signals from the signal producing means of said array to said video signal responsive means.

2. A photoelectric system for producing video and synchronization signals from a strip of film on which a photographic transparency is recorded, comprising a slit source of light, a linear array of photodetectors, distributing means responsive to a series of applied electronic signals for sequentially interrogating said photodetectors to produce a video signal, means for moving the strip of film between said source and said array to modulate the light passing from said source to said array, means responsive to the movement of the film relative to said array for producing a series of synchronizing pulses at predetermined increments of film movement, signal generating means responsive to said synchronizing pulses for producing a group of scanning signals for each synchronizing pulse, and means enabled during each scanning signal for applying said series of signals to said array.

3. Signal generating apparatus for use with a strip of photographic film on which a series of images are formed and which is formed with a series of sprocket holes in positions correlated with the locations of said images, comprising film speed control means for moving said film over a predetermined path at a substantially constant speed, means forming a slit source of light adjacent and transverse to said path on a first side of said path, at least one linear array of photoresponsive signal generating elements located on a second side of said path opposite said first side and confronting said array, a terminal, distributing means responsive to a series of applied signals for sequentially applying signals produced by said elements to said terminal, signal generating means located at a predetermined point on said path for producing a synchronizing signal in response to the passage of each sprocket hole past said point, first sweep signal generating means responsive to each synchronizing signal for producing a first scanning signal of continually varying amplitude, second sweep signal generating means responsive to each synchronizing signal for producing a group of second scanning signals of continually varying amplitude for each first scanning signal, and signal producing means enabled during at least a portion of each second scanning signal to apply said series of signals to said distributing means.

4. In combination with a color television receiver having a receiving tube of the three gun type, red, green and blue amplifiers for applying video signals to said guns, and horizontal and vertical deflection systems responsive to horizontal and vertical scanning signals to produce a raster, a tuner, and signal processing means connected to said tuner for producing output signals adapted for application to said amplifiers and said deflection systems in response to the reception of a broadcast signal by said tuner, switching means operable to first and second states, circuit means completed by said switching means in its first state for applying signals from said signal producing means to said amplifier and said deflection systems, means for moving a strip of motion picture film formed with sprocket holes marking frame locations over a predetermined path at substantially constant speed, three linear arrays of photoresponsive signal generating elements located on a first side of said path and extending across said path, a slit source of light located on a second side of said path opposite said first side and parallel to said arrays, optical means on said first side of said path between said source and said arrays for focusing red, blue and green images of a line on said film illuminated by said source onto different ones of said arrays, first, second and third distributing means each connected to the elements of a different one of said arrays and responsive to a series of applied signals to produce a video signal sequentially determined by the signals produced by the different elements of the array, whereby red, green and blue video signals are produced simultaneously when signals are simultaneously applied to said distributing means, circuit means completed by said switching means in its second state for applying said red, blue and green video signals to said red, blue and green amplifiers, respectively, detecting means located along said path and responsive to the passage of sprocket holes in said film for producing a synchronizing signal for each sprocket hole, vertical scanning signal generating means responsive to each synchronizing signal for producing a vertical scanning signal, circuit means completed by said switching means in its second state for applying said vertical scanning signal to said vertical deflection system, horizontal scanning means responsive to each synchronizing signal for producing a group of horizontal scanning signals, each having a rising portion and a falling portion for each vertical scanning signal, circuit means completed by said switching means in its second state for applying said horizontal scanning signals to said horizontal deflection system, and signal generating means enabled during the rising portion of each of said horizontal scanning signals for applying said series of signals to said distributing means.

* * * * *